United States Patent Office 3,125,542
Patented Mar. 17, 1964

3,125,542
METHOD FOR LEACHING A POLYURETHANE FOAM
Richard M. Haines, Newark, Ohio, assignor to Owens-Corning Fiberglas Corporation, a corporation of Delaware
No Drawing. Filed Oct. 26, 1960, Ser. No. 65,003
3 Claims. (Cl. 260—2.5)

The present invention relates to methods and materials for the leaching of polyurethane resin foams and particularly to the utilization of ethylene glycol monoalkyl ethers in the rapid leaching of polyurethane foams at low temperatures.

The utilization of polyurethane foams as filter and absorbent media has gained recent and widespread popularity as a result of the availability, economy and formability of such materials. However, since most polyurethane foams are closed celled structures and accordingly so impervious as to be useless in applications such as filtering wherein liquids or gases must readily pass through the media or structure, the foams must be modified or transformed in order to attain the requisite porosity or permeability.

To date, the method for transforming the closed cell polyurethane to an open celled condition comprises a leaching technique wherein the foams are immersed in boiling or near boiling basic solutions.

In the leaching of polyurethane foams, the conditions of leaching are primarily governed by the desired properties of the ultimate product and to a degree by processing limitations in the form of economy, hazards, and variations in the leaching achieved, or processing variables under uniform conditions.

While adequate porosity for purposes of filtration or a 100% open celled condition is the goal of the leaching treatment, other considerations such as structural integrity and the degree or extent of porosity are also of great importance.

In the first instance, the attainment of a 100% open celled condition is not adequate for applications such as filtration, if the opening of the cell walls and the interconnection of the cells does not also achieve the substantially complete removal of partial membranes or cell walls to leave an integral although skeletal structure comprising the cell junctures or interstices and thicker cell wall segments.

If this condition is not achieved, the resistance to fluids provided by the pierced, but residual cell walls, is adequate to prohibit the utilization of the leached foams as filtering media.

In addition, the leaching must not be so extensive as to destroy the over-all structural integrity of the leached foam. In this regard, the strength, rigidity, density and cell wall spacing of the leached product are important considerations since the structures are commercially useless when the leaching reduces any of these quantities too greatly. While it appears that the extent or degree of leaching is a mere function of the manipulation and control of the mass and nature of the foam treated, the type and concentration of the leaching composition, the temperature of the leaching bath and the duration of the treatment, processing limitations and the limits of the process variables, e.g. leaching composition, temperature, etc., have created a major impediment to the attainment of a leached structure having the desired characteristics of porosity and adequate integrity.

While the basic leaching compositions have provided for the attainment of a foam having cells which are substantially entirely interconnected or opened, the requisite balance between porosity and structural integrity has not been completely satisfied. Due to an inherent variation in the degree of leaching obtained despite the maintenance of uniform bath concentrations, temperatures and treating times, the alkaline leached foams run the gamut from structures having inadequate porosity due to the failure of the leaching to remove all vestiges of the cell walls between the cellular voids other than the skeleton forming cell junctures, to foams leached to the extent that they are lacking in requisite structural integrity and provide substantially no filtering effect or deterrency to fluids passed therethrough. While within this spectrum, foams leached to the desired or optimum degree are encountered, the system is fraught with process and product variations and the difficulty of controlling these variables.

Other problems which attend the alkaline leaching of polyurethane foams are the necessity for high temperature leaching baths, lengthy leaching periods and the noxious and corrosive hazards to personnel and apparatus which prevail at the high temperatures and stem from the alkaline leaching compositions. It has been found that adequate leaching of the foams cannot be achieved at moderate or low temperatures. At these temperatures, these foams are barely affected over leaching periods which may be measured in terms of hours. In fact, at room temperatures, it is doubtful that the foams could ever be transformed into an entirely open celled condition. Even at a temperature of 75° C., the transformation requires thirty minutes or more.

Accordingly, alkaline leaching of polyurethane foams is now conventionally conducted at a temperature of 95–100° C. for periods of from five to ten minutes.

While resort to higher temperatures has reduced the leaching time to a reasonable level, variations in the extent of leaching under uniform conditions still prevail and the hazards to personnel and apparatus due to the noxious and corrosive characteristics of the alkaline leaching compositions are increased at these temperatures.

It is an object of the present invention to provide improved leaching methods and materials for the leaching of polyester based polyurethane resin foams.

Another object is the provision of leaching methods and materials which make possible the leaching of polyester based polyurethane foams at room temperature and with greatly decreased leaching periods.

A further object is the provision of leached polyester based polyurethane foams exhibiting a completely open celled condition and structural integrity which are obtained by short leaching exposures at room temperature.

The foregoing objects are achieved by means of the utilization of basic leaching solutions containing an ethylene glycol monoalkyl ether accelerator. Through the addition of the ether accelerator, the leaching of polyurethane foams is made possible at room temperature and in greatly reduced leaching periods.

The polyurethane resin foams which are susceptible to the methods and materials of the invention are the polyester based polyurethanes which comprise the polymeric reaction product of a polyisocyanate and a polyester resin.

The basic leaching materials employed are conventional basic solutions and may be selected from a broad range of candidates including alkali salts or hydroxides, ammonium compounds, phosphates, sulfates, sulfides and other basic compounds. However, a 1 to 40% aqueous solution of sodium hydroxide is preferred.

The ether accelerators employed are glycol ethers such as ethylene glycol monomethyl ether, ethylene glycol monoethyl ether, diethylene glycol monomethyl ether and diethylene glycol monoethyl ether as represented by the general formula R—O—R'$_n$—R'—OH wherein R is an alkyl group such as methyl or ethyl, R' is a divalent hydrocarbon group and $n$ is an integer from 0 to 1.

To leach the polyester based urethane foams with the accelerated leaching compositions of the invention, a simple immersion step may be employed. However, the immersion may be accompanied by mechanical assistance such as the compression of the foam and the release or withdrawal of such compression. A thorough leaching may be accomplished at room temperature or slightly higher temperatures may be employed if desired although the elevation of the temperature is not necessary for either a thorough or rapid leaching. The leaching rate may also be advanced by increasing the amount of accelerator and while an ether accelerator-alkaline ratio of 0.11:1 part by weight is adequate for somewhat slower leaching, it has been found preferable to employ ratios of 1:1 to 2:1 for more rapid leaching. Accordingly, it is preferable that the leaching composition comprise at least 10% by weight of the ether accelerator and at least 10% by weight of an alkaline solution which comprises at least a 2% aqueous solution of an alkaline material such as the hydroxides of alkali and alkaline earth metals and particularly sodium hydroxide.

The following examples illustrate accelerated leaching compositions prepared according to the invention:

*Example 1*

Two parts by weight of a 4% solution of sodium hydroxide were added to one part by weight of ethylene glycol monoethyl ether.

*Example 2*

Two parts by weight of a 5% solution of sodium hydroxide were added to one part by weight of ethylene glycol monoethyl ether.

*Example 3*

Two parts by weight of a 10% solution of sodium hydroxide were added to one part by weight of ethylene glycol monoethyl ether.

*Example 4*

Two parts by weight of a 10% solution of sodium hydroxide were added to one part by weight of ethylene glycol monoethyl ether.

*Example 5*

One part by weight of a 20% solution of sodium hydroxide was added to one part by weight of ethylene glycol monoethyl ether.

*Example 6*

One part by weight of a 20% solution of sodium hydroxide was added to two parts by weight of ethylene glycol monoethyl ether.

*Example 7*

One part by weight of a 20% solution of sodium hydroxide was added to two parts by weight of ethylene glycol monomethyl ether.

The leaching effects of the accelerated leaching compositions of Examples 1 through 7 were determined upon polyester based polyurethane foams, under various conditions of temperature and time to provide the data set forth in the following table:

| Leaching Solution | Foam Sample # | Leaching Temp. (° C.) | Leaching Time (Seconds) | Leaching Effect |
|---|---|---|---|---|
| Example 1 | 1 | 29 | 630 | Complete. |
| Example 2 | 2 | 24 | 240 | Incomplete. |
|  | 3 | 35 | 120 | Complete. |
|  | 4 | 29 | 300 | Do. |
|  | 5 | 29 | 360 | Do. |
| Example 3 | 6 | 50 | 60 | Incomplete. |
|  | 7 | 50 | 180 | Do. |
|  | 8 | 50 | 300 | Do. |
|  | 9 | 50 | 600 | Complete. |
| Example 4 | 10 | 34 | 60 | Incomplete. |
|  | 11 | 34 | 75 | Complete. |
|  | 12 | 33 | 60 | Do. |
|  | 13 | 24 | 150 | Do. |
|  | 14 | 24 | 120 | Do. |
|  | 15 | 24 | 210 | Incomplete. |
|  | 16 | 24 | 150 | Complete. |
| Example 5 | 17 | 34 | 30 | Do. |
| Example 6 | 18 | 28 | 10 | Do. |
|  | 19 | 28 | 10 | Do. |
|  | 20 | 28 | 10 | Do. |
| Example 7 | 21 | 40 | 60 | Incomplete. |
|  | 22 | 40 | 90 | Complete. |
|  | 23 | 40 | 120 | Do. |
|  | 24 | 40 | 180 | Excessive. |

The designations "incomplete," "complete" and "excessive" are employed to designate those conditions wherein the foams are leached to some degree but not all cell walls are removed, the foams are satisfactorily leached to remove substantially all of the cell walls and yet to leave an integral skeleton, and that condition wherein leaching progresses to the point at which structural integrity is destroyed or the foam is completely dissolved.

The foams upon which the leaching effect was measured were prepared by conventional methods from the following ingredients which are expressed in parts by weight:

Polyester resin (Witco Fomrez #50) _____ 100
Toluene diisocyanate (Mondur TD-80) _____ 45
Combination surfactant (Witco 77-86) _____ 2.0
N-methyl morpholine _____ 2.0
Silicone (L-520) _____ 0.2
Water _____ 3.5

Witco Fomrez #50 is an adipic acid-glycol based saturated polyester resin having a hydroxyl number of 50, a maximum acid number of 2.0, a maximum water content (Karl Fischer) of 0.1%, a color (Gardner 1933) of 3.0, a viscosity (Brookfield @ 25° C.) of between 17,000–20,000 centipoises, a specific gravity of 1.19 at 25° C., and a clear appearance, Mondur TD-80 is a mixture of 80% 2,4-toluene diisocyanate and 20% 2,6-toluene diisocyanate, Witco 77-86 is a combination surfactant emulsifier comprising the reaction product of an unsaturated fatty acid and ethylene oxide (70%), a sulfonated oil (15%), and an alkyl naphthenate (15%) to yield a 70:30 ratio of ionic:nonionic materials, and L-520 is an organosilicone fluid having the formula

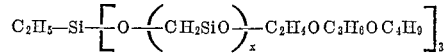

wherein the total of the 3$x$'s is approximately 20 and prepared from a polyol which is chain stopped at one end by a butoxy group. This organosilicone fluid is approximately 25% by weight silicone and 75% by weight polyol, and has a specific gravity of 1.03 at 25° C., a pour point of −34° F., a flash point (COC) of 505° F. and the following viscosities (centistokes) at the specified temperatures: 900 at 77° F., 600 at 100° F., and 90 at 210° F.

As previously stated, the foams tested were all polyester based polyurethane foams and the samples selected varied in thickness from ⅜ to 1 inch. In addition, fine, medium and coarse celled foams were employed. While it was noted that the thickness of the foam samples did not exert a significant influence upon the degree of leaching achieved, the cell size was an influencing factor. For example, coarse celled foam sample #15 was incompletely leached under conditions of temperature and duration greater than those utilized to completely leach the medium and fine celled foams of Examples 13 and 14 respectively.

It is apparent from the data embodied in the above table that while the ether accelerators of the invention are generally conducive to improvements in the performance of alkaline or basic leaching techniques, certain specific combinations and concentrations are preferable due to the degree of improvement attained.

For example, with a leaching composition comprising 25–50% of a 20% sodium hydroxide solution and 50–75% of an ether accelerator, the foams may be satisfactorily leached at room temperature or slightly above in leaching periods ranging from 10 seconds to 1 minute.

Alternatively, with a composition comprising 67% of a 5% solution of sodium hydroxide and 33% of the ether accelerator, leaching times of 2 to 10 minutes and temperatures of 29–35° C. are necessitated.

However, this does not indicate that low alkali concentrations or a small proportion of the ether accelerator do not bring about satisfactory leaching since foam sample 3 was adequately leached at 35° C. in a period of 2 minutes while employing a leaching composition comprising 67% by weight of a mere 5% sodium hydroxide solution and only 33% of the ether accelerator. Also, in the case of Example 4, adequate leaching was achieved with a 10% solution of sodium hydroxide and 33% by weight of the ether accelerator in periods of 1 to 2 minutes at a temperature of 33° C.

It is further noted that the accelerating activity of the ethylene glycol monoethyl ether is superior to that of ethylene glycol monomethyl ether. For example, in leachings conducted with the methyl ether composition of Example 3, temperatures of 50° C. and a leaching period of 10 minutes were required for satisfactory leaching. Alternatively, temperatures of 24–34° C. in leaching periods of 1–2.5 minutes were required with a substitution of the ethyl ether as in Example 4.

The variation in the efficiency of the methyl and ethyl ethers is considerably less when a 20% sodium hydroxide solution and 67% by weight of the ether are utilized as in Example 7. In that case, the leaching period is reduced to 1.5–2 minutes and the temperature to 40° C. as compared to 10 seconds and 28° C. with a similar ratio of the ethyl ether as indicated in Example 6.

It is apparent that improved methods and materials for the leaching of polyester based polyurethane resin foams are provided by the present invention. By means of these methods and materials, the low temperature leaching of these foams in greatly reduced leaching periods is made possible.

It is obvious that various changes, alterations and substitutions may be made in the methods and materials of the present invention without departing from the spirit of the invention as defined by the following claims.

I claim:

1. In a method for the leaching of a polyurethane foam by means of contacting a leachable polyurethane foam prepared by reacting an organic polyisocyanate and a polyester with an alkaline solution for a time sufficient to exert a leaching effect upon said foam and to remove the cell walls of said foam, the improvement comprising incorporating a monohydroxy glycol ether having the general formula R—O—R'$_n$—R'—OH, wherein R is an alkyl group having no more than two carbon atoms, R' is a divalent hydrocarbon group having no more than two carbon atoms, and $n$ is an integer having a value from 0 to 1, in said alkaline solution.

2. A method as claimed in claim 1 in which said glycol ether is selected from the group consisting of ethylene glycol monoethyl ether, ethylene glycol monomethyl ether, diethylene glycol monomethyl ether, and diethylene glycol monoethyl ether.

3. A method as claimed in claim 1 in which said glycol ether is ethylene glycol monoethyl ether.

References Cited in the file of this patent

UNITED STATES PATENTS

| | | |
|---|---|---|
| 1,614,883 | Davidson | Jan. 18, 1927 |
| 1,732,356 | Davidson | Oct. 22, 1929 |
| 2,662,837 | Duncan | Dec. 15, 1953 |
| 2,710,843 | Stebleton | June 14, 1955 |
| 2,839,478 | Wilms et al. | June 17, 1958 |
| 2,897,104 | Duncan | July 28, 1959 |
| 2,900,278 | Powers et al. | Aug. 18, 1959 |
| 2,961,710 | Stark | Nov. 29, 1960 |

FOREIGN PATENTS

| | | |
|---|---|---|
| 789,481 | Great Britain | Jan. 22, 1958 |
| 1,176,004 | France | Nov. 17, 1958 |